(12) United States Patent
Bhan et al.

(10) Patent No.: US 12,164,784 B2
(45) Date of Patent: Dec. 10, 2024

(54) MEMORY CONTROLLER FOR PERFORMING WEAR-LEVELING AND MEMORY SYSTEM INCLUDING THE SAME

(71) Applicant: SK hynix Inc., Gyeonggi-do (KR)

(72) Inventors: Dong Min Bhan, Gyeonggi-do (KR); Seon Ju Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 15 days.

(21) Appl. No.: 18/096,563

(22) Filed: Jan. 13, 2023

(65) Prior Publication Data

US 2024/0028219 A1 Jan. 25, 2024

(30) Foreign Application Priority Data

Jul. 21, 2022 (KR) ........................ 10-2022-0090051

(51) Int. Cl.
*G06F 3/06* (2006.01)

(52) U.S. Cl.
CPC ............ *G06F 3/0619* (2013.01); *G06F 3/064* (2013.01); *G06F 3/0656* (2013.01); *G06F 3/0659* (2013.01); *G06F 3/0673* (2013.01)

(58) Field of Classification Search
CPC ...... G06F 3/0619; G06F 3/064; G06F 3/0656; G06F 3/0659; G06F 3/0673
See application file for complete search history.

(56) References Cited

U.S. PATENT DOCUMENTS

| | | | | |
|---|---|---|---|---|
| 2006/0106972 A1* | 5/2006 | Gorobets | ............ | G06F 12/0246 711/E12.008 |
| 2018/0024756 A1* | 1/2018 | Miller | ..................... | H04L 49/35 |
| 2020/0142589 A1* | 5/2020 | Galbo | .................. | G06F 3/0616 |
| 2020/0159411 A1* | 5/2020 | Mukaida | ............. | G06F 12/0646 |

FOREIGN PATENT DOCUMENTS

| | | |
|---|---|---|
| KR | 10-2016-0150451 A | 12/2016 |
| KR | 10-2020-0095103 A | 8/2020 |

* cited by examiner

*Primary Examiner* — Eric T Loonan
(74) *Attorney, Agent, or Firm* — IP & T GROUP LLP

(57) ABSTRACT

Provided herein may be a memory controller and a memory system including the same. The memory controller may include a plurality of control cores configured to control a plurality of zone blocks respectively corresponding to logical address groups provided by a host, a buffer memory configured to store information about a zone group including zone blocks which are controlled by different control cores among the plurality of zone blocks, the information about zone group being generated based on information about an available space in each of the plurality of zone blocks, and a wear-leveling controller configured to control the plurality of control cores to perform a global wear-leveling operation of swapping pieces of data between the zone blocks included in the zone group based on a wear-level of the plurality of zone blocks.

17 Claims, 12 Drawing Sheets

FIG. 4

Cnt Info                                                              230

|            | FIRST CONTROL CORE | SECOND CONTROL CORE | THIRD CONTROL CORE | FOURTH CONTROL CORE |
|------------|--------------------|---------------------|--------------------|---------------------|
| Erase cnt  | 80                 | 10                  | 40                 | 20                  |

FIG. 6

Zone Group Info 230

|  | FIRST CONTROL CORE | SECOND CONTROL CORE | THIRD CONTROL CORE | FOURTH CONTROL CORE |
| --- | --- | --- | --- | --- |
| Zone_GR1 | ZB_1 | ZB_2 | ZB_3 | ZB_4 |
| Zone_GR2 | ZB_5 | ZB_6 | ZB_7 | ZB_8 |
| Zone_GR3 | ZB_9 | ZB_10 | ZB_11 | ZB_12 |

Data occupancy Info

|  | FIRST CONTROL CORE | SECOND CONTROL CORE | THIRD CONTROL CORE | FOURTH CONTROL CORE |
| --- | --- | --- | --- | --- |
| Zone_GR1 | 5 | 2 | 4 | 1 |
| Zone_GR2 | 1 | 5 | 0 | 4 |
| Zone_GR3 | 2 | 1 | 6 | 2 |

FIG. 8

Zone Group Info  230

|  | FIRST CONTROL CORE | SECOND CONTROL CORE | THIRD CONTROL CORE | FOURTH CONTROL CORE |
|---|---|---|---|---|
| Zone_GR1 | ZB_1 | ZB_6 | ZB_11 | ZB_8 |
| Zone_GR2 | ZB_9 | ZB_2 | ZB_3 | ZB_12 |
| Zone_GR3 | ZB_5 | ZB_10 | ZB_7 | ZB_4 |

Data occupancy Info

|  | FIRST CONTROL CORE | SECOND CONTROL CORE | THIRD CONTROL CORE | FOURTH CONTROL CORE |
|---|---|---|---|---|
| Zone_GR1 | 5 | 5 | 6 | 4 |
| Zone_GR2 | 2 | 2 | 4 | 2 |
| Zone_GR3 | 1 | 1 | 0 | 1 |

MEMORY CONTROLLER FOR PERFORMING WEAR-LEVELING AND MEMORY SYSTEM INCLUDING THE SAME

CROSS-REFERENCE TO RELATED APPLICATION

The present application claims priority under 35 U.S.C. § 119(a) to Korean patent application number 10-2022-0090051, filed on Jul. 21, 2022, the entire disclosure of which is incorporated herein by reference.

BACKGROUND

1. Field of Invention

Various embodiments of the present disclosure relate to an electronic device, and more particularly to a memory controller and a memory system including the memory controller.

2. Description of Related Art

A memory system is a device which stores data under the control of a host device such as a computer or a smartphone. The memory system may include a memory device in which data is stored and a memory controller which controls the memory device. Memory devices are classified as a volatile memory device and a nonvolatile memory device.

The nonvolatile memory device may be a memory device in which stored data is retained even when the supply of power is interrupted. 20 Examples of the nonvolatile memory device may include a read only memory (ROM), a programmable ROM (PROM), an electrically programmable ROM (EPROM), an electrically erasable and programmable ROM (EEPROM), and a flash memory.

The nonvolatile memory device may include a plurality of nonvolatile memory areas. The frequency with which each of the nonvolatile memory areas is used may vary depending on requests received from a host. When any of the plurality of nonvolatile memory areas is frequently used and is first worn out, the lifetime of the nonvolatile memory device may be shortened. A memory controller may control data movement between the plurality of nonvolatile memory areas to adjust the frequencies with which respective nonvolatile memory areas are used to be similar.

SUMMARY

Various embodiments of the present disclosure are directed to a memory controller that is capable of equalizing wear levels between nonvolatile memory areas and a memory system including the memory controller.

An embodiment of the present disclosure may provide for a memory controller. The memory controller may include a plurality of control cores configured to control a plurality of zone blocks respectively corresponding to logical address groups provided by a host, a buffer memory configured to store information about a zone group including zone blocks which are controlled by different control cores among the plurality of zone blocks, the information about zone group being generated based on information about an available space in each of the plurality of zone blocks, and a wear-leveling controller configured to control the plurality of control cores to perform a global wear-leveling operation of swapping pieces of data between the zone blocks included in the zone group based on a wear-level of the plurality of zone blocks.

An embodiment of the present disclosure may provide for a method of operating a memory controller, the memory controller including a plurality of control cores configured to control a plurality of zone blocks respectively corresponding to logical address groups provided by a host. The method may include generating information about a zone group including zone blocks controlled by different control cores based on information about an available space in each of the plurality of zone blocks, and performing a global wear-leveling operation of swapping pieces of data between the zone blocks included in the zone group based on a wear-level of the plurality of zone blocks.

An embodiment of the present disclosure may provide for a memory system. The memory system may include non-volatile memory areas included in a plurality of zone blocks respectively corresponding to logical address groups provided by a host, and a controller configured to map, based on a size of data stored in each of the plurality of zone blocks, zone blocks controlled by different control cores to a zone group among the plurality of zone blocks, and perform a global wear-leveling operation of swapping pieces of data between the zone blocks mapped to the zone group.

An embodiment of the present disclosure may provide for a memory system. The memory system may include a non-volatile storage device including first groups each configured by zone blocks, and a controller configured to logically arrange the first groups into second groups each configured by zone blocks from the respective first groups and of the same rank in amounts of data stored therein within the respective first groups, and control the non-volatile storage device to perform a wear-leveling operation in units of the second groups. Wherein the controller may control the non-volatile storage device to perform the wear-leveling operation sequentially on the second groups in a descending order of the rank.

BRIEF DESCRIPTION OF THE DRAWINGS

FIG. 4 is a diagram illustrating erase count information for zone blocks respectively controlled by a plurality of control cores according to an embodiment of the present disclosure.

FIG. 6 is a diagram illustrating zone group information and zone block occupancy information according to an embodiment of the present disclosure.

FIG. 8 is a diagram illustrating updated zone group information and zone block occupancy information according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
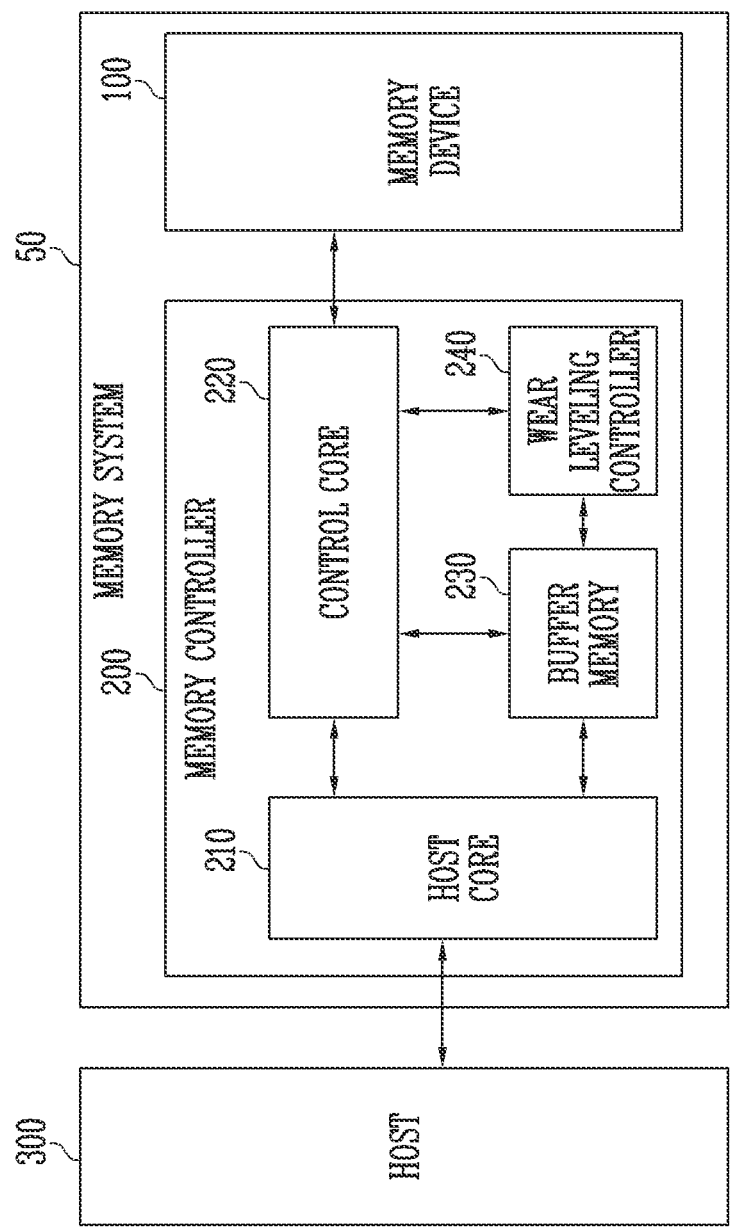
FIG. 1 is a diagram illustrating a memory system according to an embodiment of the present disclosure.

FIG. 1 is a diagram illustrating a memory system 50 according to an embodiment of the present disclosure.

Referring to FIG. 1, the memory system 50 may include a memory device 100 and a memory controller 200. The memory system 50 may be a device which stores data under the control of a host 300, such as a mobile phone, a smartphone, an MP3 player, a laptop computer, a desktop computer, a game console, a TV, a tablet PC, or an in-vehicle infotainment system.

The memory system 50 may be manufactured as any of various types of storage devices depending on a host interface that is a scheme for communication with the host 300. For example, the memory system 50 may be implemented as any of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The memory system 50 may be manufactured in any of various types of package forms. For example, the memory system 50 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated in response to the control of the memory controller 200. The memory device 100 may include a memory cell array (not illustrated) including a plurality of memory cells which store data.

The memory cell array (not illustrated) may include a plurality of memory blocks. Each memory block may include a plurality of memory cells. The memory device 100 may include a plurality of zone blocks, each including a plurality of memory blocks.

In an embodiment, the memory device 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (STT-RAM).

The memory device 100 may receive a command and an address from the memory controller 200, and may access the area of the memory cell array, selected by the address. The memory device 100 may perform an operation indicated by the command on the area selected by the address. For example, the memory device 100 may perform a write operation (i.e., a program operation), a read operation, and an erase operation. During a write operation, the memory device 100 may program data to the area selected by the address. During a read operation, the memory device 100 may read data from the area selected by the address. During an erase operation, the memory device 100 may erase data stored in the area selected by the address.

The memory controller 200 may control the overall operation of the memory system 50.

When power is applied to the memory system 50, the memory controller 200 may run firmware (FW). When the memory device 100 is a flash memory device, the firmware (FW) may include a host interface layer (HIL) which controls communication with the host 300, a flash translation layer (FTL) which controls communication between the host 300 and the memory device 100, and a flash interface layer (FIL) which controls communication with the memory device 100.

In an embodiment, the memory controller 200 may receive data and a logical block address (LBA) from the host 300, and may translate the logical block address (LBA) into a physical block address (PBA) indicating the address of memory cells which are included in the memory device 100 and in which data is to be stored. In the present specification, the terms "logical block address (LBA)" and "logical address" may be used interchangeably. In the present specification, the terms "physical block address (PBA)" and "physical address" may be used interchangeably.

The memory controller 200 may control the memory device 100 so that a write operation, a read operation or an erase operation is performed in response to a request received from the host 300. During a write operation, the memory controller 200 may provide a write command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may include a host core 210, a control core 220, a buffer memory 230, and a wear-leveling controller 240.

The host core 210 may receive a request from the host 300, and may provide the request to the control core 220. The host core 210 may provide a logical address and data, which correspond to a write request, to the control core 220. The host core 210 may provide a logical address corresponding to a read request to the control core 220. In an embodiment, the host core 210 may receive logical address groups respectively corresponding to a plurality of zones. One logical address group may correspond to one zone. Each of the logical address groups may include consecutive logical addresses. The respective logical address groups may be logical address groups provided by different applications executed by the host 300. The host core 210 may allocate a plurality of zones respectively corresponding to the logical address groups to the control core 220. A plurality of zone blocks included in the memory device 100 may be allocated to the plurality of zones, respectively. In an embodiment, the unit of a zone block may be a memory block. In an embodiment, the unit of a zone block may be a super block. The size of each zone may correspond to that of the corresponding zone block.

The control core 220 may control the overall operation of the memory device 100. For example, the control core 220 may provide a command to the memory device 100, and may control the memory device 100 to perform an operation corresponding to the command. For example, the control core 220 may translate logical addresses corresponding to the requests received from the host core 210 into physical addresses of the memory device 100.

The control core 220 may be composed of a plurality of control cores. The plurality of control cores may control a plurality of zone blocks, respectively. Each control core may control a zone block corresponding to an allocated zone.

The buffer memory 230 may temporarily store data provided from the host 300, or may temporarily store data read from the memory device 100. In an embodiment, the buffer memory 230 may be a volatile memory device. For example, the buffer memory 230 may be a dynamic random access memory (DRAM) or a static random access memory (SRAM). The buffer memory 230 may be included in the memory controller 200, or may be located outside the memory controller 200.

In an embodiment, the buffer memory 230 may store metadata. The metadata may be data including information used to operate the memory system 50. In an embodiment, the metadata may include map data including a corresponding relationship between logical addresses and physical addresses.

In an embodiment, the buffer memory 230 may store information related to zone blocks. The information related to zone blocks may include erase count information indicating the number of erase operations performed on each zone block, information about the size of data stored in the zone blocks, and information about an available space in each of the zone blocks. In an embodiment, the information about zone blocks may include read count information indicating the number of read operations performed on the corresponding zone block and information about the number of fail bits in data stored in the corresponding zone block.

In an embodiment, the buffer memory 230 may store information about zone groups. The zone group information may be information in which zone blocks controlled by different control cores, among the plurality of control cores, are mapped to the corresponding zone group. The zone group information may be information generated based on the size of data stored in each of the zone blocks. The zone group information may be information generated based on information about an available space in each of the zone blocks. In an embodiment, the zone group information may be periodically updated.

The wear-leveling controller 240 may control a global wear-leveling operation of swapping pieces of data between zone blocks included in the corresponding zone group. The wear-leveling controller 240 may control the control core 220 to perform the global wear-leveling operation based on the wear-level of the zone blocks. The wear-level of the zone blocks may be an erase count value for the zone blocks respectively controlled by the plurality of control cores. In an embodiment, the wear-leveling controller 240 may control the plurality of control cores to perform a global wear-leveling operation when the erase count value for zone blocks controlled by any of the plurality of control cores is greater than a reference count value.

In an embodiment, the memory controller 200 may internally generate a command, an address, and data regardless of whether a request from the host 300 is received, and may transmit them to the memory device 100. For example, the memory controller 200 may provide the memory device 100 with commands, addresses, and data required in order to perform read operations and write operations that are involved in performing wear-leveling, read reclaim, garbage collection, etc. The wear-leveling, read reclaim, garbage collection, etc. may be performed based on the information related to zone blocks.

The host 300 may communicate with the memory system 50 using at least one of various communication standards or interfaces such as universal serial bus (USB), Serial AT Attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
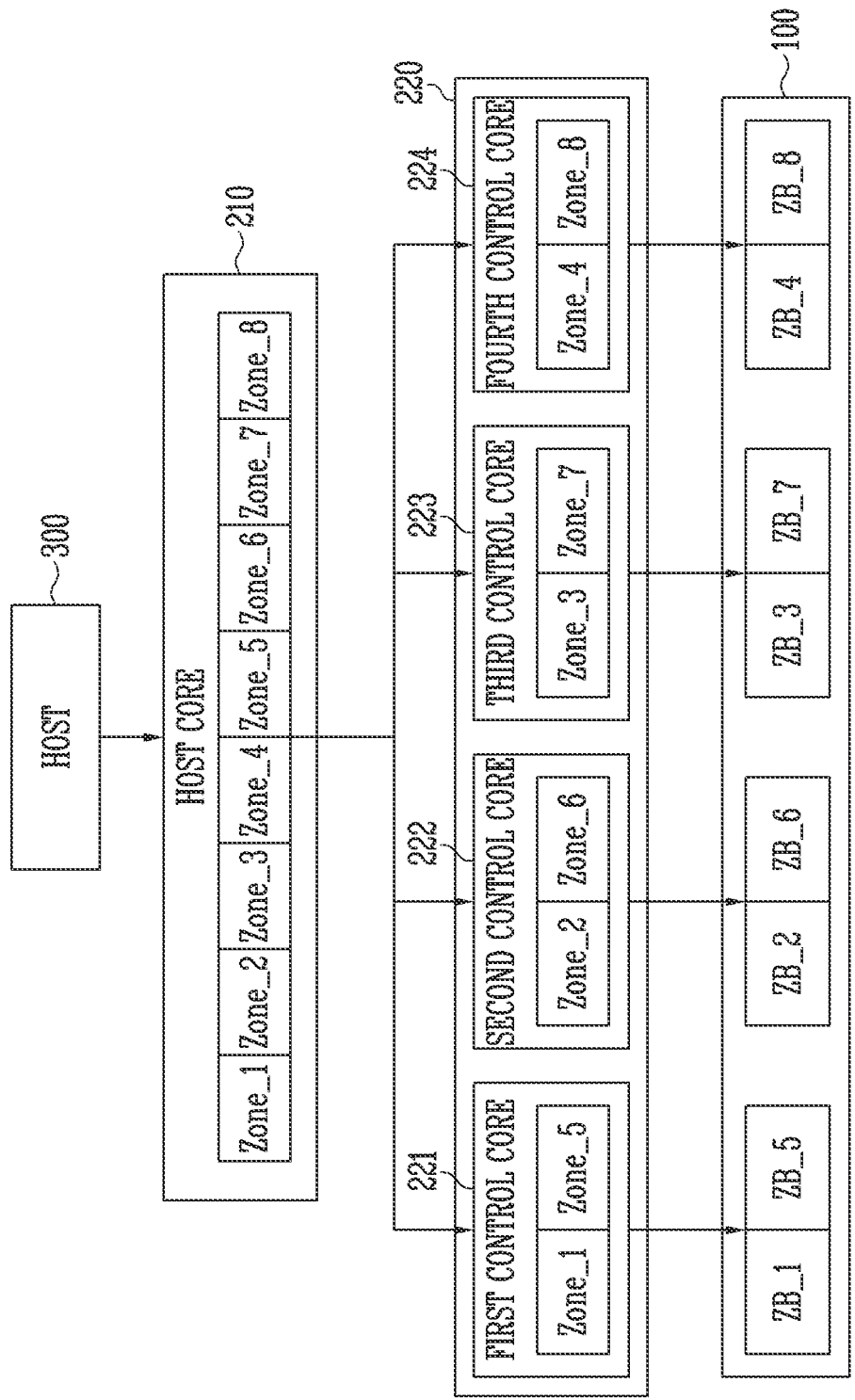
FIG. 2 is a diagram illustrating a plurality of control cores for controlling a plurality of zone blocks respectively corresponding to a plurality of zones according to an embodiment of the present disclosure.

FIG. 2 is a diagram illustrating a plurality of control cores which control a plurality of zone blocks respectively corresponding to a plurality of zones according to an embodiment of the present disclosure.

Referring to FIG. 2, the control core 220 may include a plurality of control cores. In an example, the control core 220 may include first to fourth control cores 221 to 224. In an example, the control core 220 may include three or fewer control cores, or five or more control cores.

The host core 210 may receive logical address groups from the host 300. One logical address group may correspond to one zone. For example, logical addresses included in one logical address group may correspond to a first zone Zone_1, and logical addresses included in another logical address group may correspond to a second zone Zone_2. The host core 210 may allocate the received logical address groups to the first to fourth control cores 221 to 224 based on predefined criteria. In an embodiment, the host core 210 may sequentially allocate the logical address groups, respectively corresponding to first to eighth zones Zone_1 to Zone_8, to the first to fourth control cores 221 to 224. For example, the host core 210 may allocate a logical address group corresponding to the first zone Zone_1 and a logical address group corresponding to the fifth zone Zone_5 to the first control core 221.

The first to fourth control cores 221 to 224 may allocate zone blocks respectively corresponding to the logical address groups. For example, the first control core 221 may allocate a first zone block ZB_1 corresponding to the first zone Zone_1 and a fifth zone block ZB_5 corresponding to the fifth zone Zone_5. The first control core 221 may control the memory device 100 so that data provided together with the logical address group corresponding to the first zone Zone_1 is stored in the first zone block ZB_1. The first control core 221 may control the memory device 100 so that data provided together with the logical address group corresponding to the fifth zone Zone_5 is stored in the fifth zone block ZB_5.

In the same manner as the first control core 221, the second to fourth control cores 222 to 224 may also allocate zone blocks respectively corresponding to allocated zones.

Each control core may read data from zone blocks corresponding to respective zones.

Figure 3:
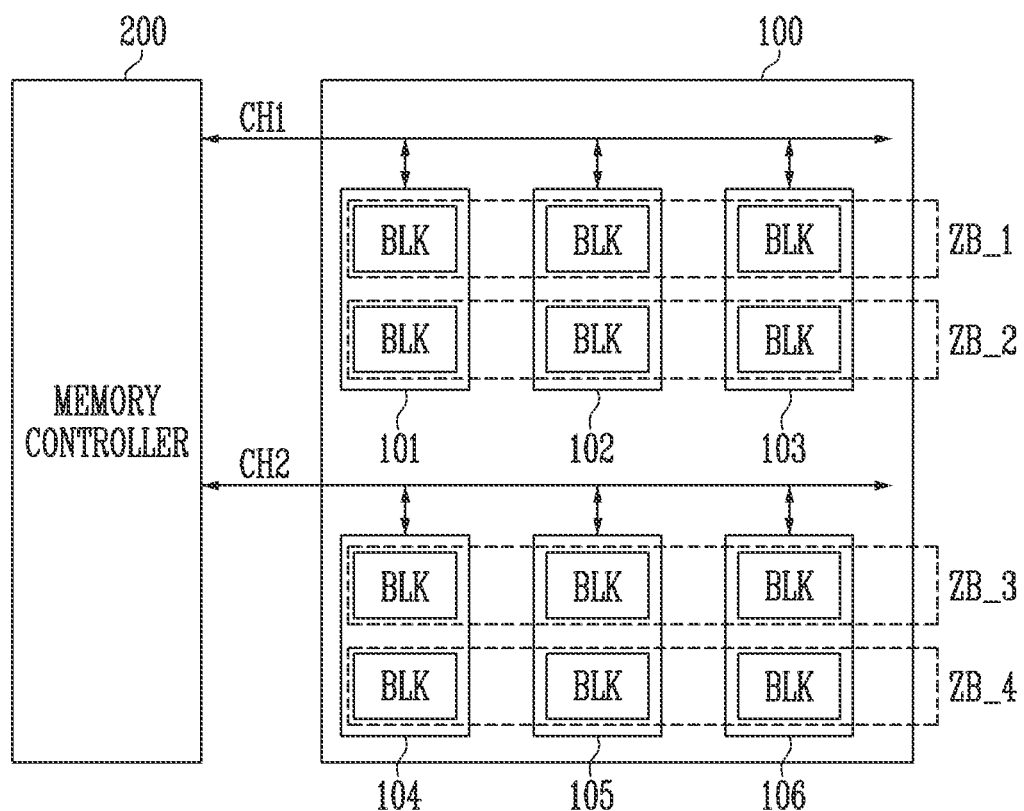
FIG. 3 is a diagram illustrating a plurality of zone blocks included in a memory device according to an embodiment of the present disclosure.

FIG. 3 is a diagram illustrating a plurality of zone blocks included in a memory device according to an embodiment of the present disclosure.

Referring to FIG. 3, the memory device 100 illustrated in FIG. 1 may include a plurality of memory devices 101 to 106. Each of the plurality of memory devices 101 to 106 may include a plurality of memory blocks. In FIG. 3, for convenience of description, the case in which each of the plurality of memory devices 101 to 106 includes two memory blocks is described by way of example. The memory controller 200 may be coupled to the plurality of memory devices 101 to 106 through first and second channels CH1 and CH2. In an embodiment, the number of channels or the number of memory devices coupled to each of the channels may be changed in various forms without being limited to that illustrated in FIG. 3.

The first to third memory devices 101 to 103 may be coupled 5 in common to the first channel CH1. The first to third memory devices 101 to 103 may communicate with the memory controller 200 through the first channel CH1. While any of the first to third memory devices 101 to 103 is communicating with the memory controller 200 through the first channel CH1, other memory devices may not communicate with the memory controller 200. For example, communication between the first to third memory devices 101 to 103 and the memory controller 200 may be a data input/output operation.

However, each of the first to third memory devices 101 to 103 may internally perform an operation corresponding to a command received from the memory controller. For example, the operation corresponding to the command received from the memory controller may be a program operation, a read operation, or an erase operation.

The fourth to sixth memory devices 104 to 106 coupled to the second channel CH2 may be operated in the same manner as the first to third memory devices 101 to 103 coupled to the above-described first channel CH1.

The memory system 50 composed of the plurality of memory devices may perform operations using an interleaving scheme. The interleaving scheme may be a scheme which performs an operation of reading data from each of a plurality of memory devices or storing data therein in a structure in which the plurality of memory devices share a single channel with each other. In an embodiment, the memory controller 200 may distribute and allocate pieces of data corresponding to consecutive logical addresses to a plurality of memory devices, respectively.

In an embodiment, the memory controller 200 may transmit a command, an address, and data to the first memory device 101 through the first channel CH1. The memory controller 200 may transmit a command, an address, and data to the second memory device 102 while the first memory device 101 receives data and performs a program operation.

In an embodiment, one or more memory blocks included in the first to third memory devices 101 to 103 may form a first zone block ZB_1. In an embodiment, one or more memory blocks included in the fourth to sixth memory devices 104 to 106 may form a third zone block ZB_3.

In an embodiment, each zone block may be composed of one or more memory blocks included in a plurality of memory devices coupled to different channels. For example, a zone block may be composed of one or more memory blocks included in the first memory device 101 and the fourth memory device 104.

In an embodiment, each zone block may be composed of a plurality of memory blocks included in one memory device.

In an embodiment, a plurality of control cores may control a plurality of zone blocks, respectively. Each of the plurality of zone blocks may include one or more memory blocks included in each of the plurality of memory devices. In an embodiment, the first zone block ZB_1 may be a zone block controlled by the first control core 221 illustrated in FIG. 2. Similarly, the second to fourth zone blocks ZB_2 to ZB_4 may be zone blocks controlled by the second to fourth control cores 222 to 224, respectively.

Each of the plurality of control cores may store data and read stored data on a zone block basis. In an embodiment, each zone block may be a super block.

FIG. 4 is a diagram illustrating erase count information for zone blocks respectively controlled by a plurality of control cores according to an embodiment of the present disclosure.

Referring to FIG. 4, the buffer memory 230 illustrated in FIG. 1 may store erase count value information Cnt Info for zone blocks. The buffer memory 230 may store erase count values for zone blocks controlled by respective control cores.

In an example, referring to FIG. 2, an erase count value for the first control core stored in the buffer memory 230 may be the sum of erase count values for the first zone block and the fifth zone block that are controlled by the first control core. In an example, the erase count value for the first control core stored in the buffer memory 230 may be the average of the erase count value for the first zone block and the erase count value for the fifth zone block. Similarly, an erase count value for the second control core may be the sum or average of erase count values for zone blocks that are controlled by the second control core.

The erase count value information for zone blocks may be updated whenever an erase operation is performed on the zone blocks. For example, the erase count value for the zone blocks may be increased by an erase operation performed by the memory controller or an erase operation performed in response to a request from the host. The request from the host for performing an erase operation may include a zone reset request.

The wear-leveling controller 240 illustrated in FIG. 1 may control the plurality of control cores so that a global wear-leveling operation is performed based on information about the erase count value for zone blocks stored in the buffer memory 230. In detail, the wear-leveling controller 240 may control the plurality of control cores so that, when the erase count value for zone blocks controlled by each control core exceeds a reference count value, a global wear-leveling operation is performed. The wear-leveling controller 240 may perform a global wear-leveling operation of swapping data stored in zone blocks controlled by a control core having the highest erase count value, among the plurality of control cores with data stored in zone blocks controlled by a control core having the lowest erase count value.

For example, when the reference count value is 70, an erase count value for the first control core is 80, and thus the wear-leveling controller 240 may perform a global wear-leveling operation. Further, because the erase count value for the second control core is the lowest value, that is, 10, the wear-leveling controller 240 may control the first and second control cores to swap data stored in the zone blocks controlled by the first control core with data stored in the zone blocks controlled by the second control core. Furthermore, the wear-leveling controller 240 may control the third and fourth control cores to swap data stored in the zone blocks controlled by the third control core with data stored in the zone blocks controlled by the fourth control core.

Figure 5:
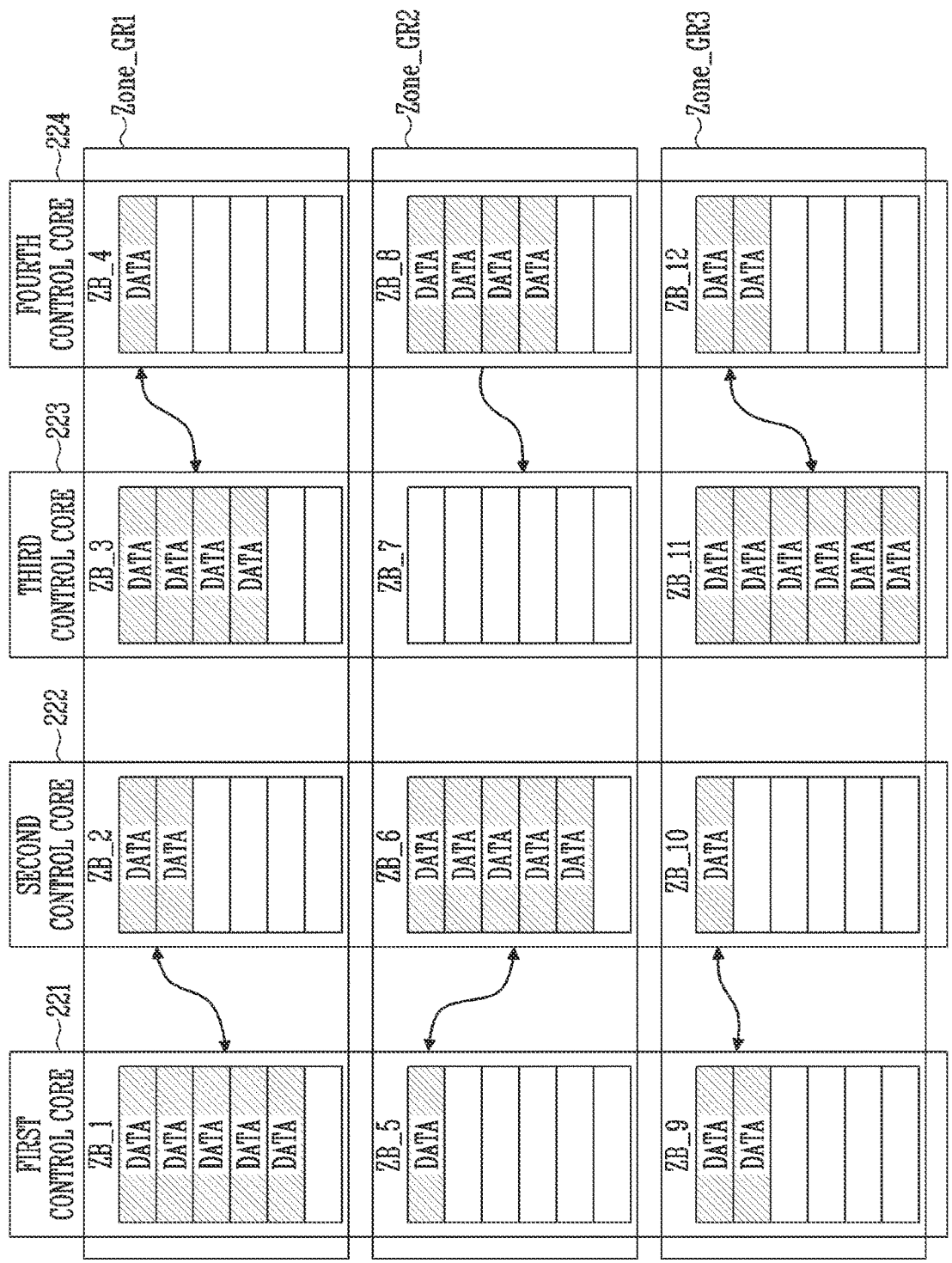
FIG. 5 is a diagram illustrating a global wear-leveling operation between zone blocks included in each zone group according to an embodiment of the present disclosure.

FIG. 5 is a diagram illustrating a global wear-leveling operation between zone blocks included in each zone group according to an embodiment of the present disclosure.

In FIG. 5, the case in which each control core controls three zone blocks will be described in detail by way of example. Referring to FIG. 5, a first control core 221 may control a first zone block ZB_1, a fifth zone block ZB_5, and a ninth zone block ZB_9. A second control core 222 may control a second zone block ZB_2, a sixth zone block ZB_6, and a tenth zone block ZB_10. A third control core 223 may control a third zone block ZB_3, a seventh zone block ZB_7, and an eleventh zone block ZB_11. A fourth control core 224 may control a fourth zone block ZB_4, an eighth zone block ZB_8, and a twelfth zone block ZB_12.

The wear-leveling controller 240 illustrated in FIG. 1 may control the first to fourth control cores 221 to 224 to perform a global wear-leveling operation of swapping data between zone blocks controlled by different control cores.

In detail, the wear-leveling controller 240 may control the first and second control cores 221 and 222 to swap data stored in zone blocks controlled by the first control core 221 with data stored in zone blocks controlled by the second control core 222. For example, an erase count value for the first control core 221, among the first to fourth control cores 221 to 224, may be the highest, and an erase count value for the second control core 222 may be the lowest. Further, the wear-leveling controller 240 may control the third and fourth control cores 223 and 224 to swap data stored in zone blocks controlled by the third control core 223 with data stored in zone blocks controlled by the fourth control core 224.

In an embodiment, the wear-leveling controller 240 may control the plurality of control cores to swap pieces of data between zone blocks included in the corresponding zone group during the global wear-leveling operation. The zone blocks included in the corresponding zone group may be the zone blocks controlled by different control cores. For example, a first zone group Zone_GR1 may include a first zone block ZB_1, a second zone block ZB_2, a third zone block ZB_3, and a fourth zone block ZB_4. The wear-leveling controller 240 may control the first to fourth control cores 221 to 224 to swap pieces of data between the first to fourth zone blocks ZB_1 to ZB_4 during a global wear-leveling operation.

Here, the first zone block ZB_1, the second zone block ZB_2, the third zone block ZB_3, and the fourth zone block ZB_4 may be zone blocks numbered with the same number in respective control cores. In detail, the first zone block ZB_1 may be zone block 1 in the first control core 221, the second zone block ZB_2 may be zone block 1 in the second control core 222, the third zone block ZB_3 may be zone block 1 in the third control core 223, and the fourth zone block ZB_4 may be zone block 1 in the fourth control core 224. That is, the wear-leveling controller 240 may control a plurality of control cores to swap pieces of data between zone blocks numbered with the same number in respective control cores during the global wear-leveling operation.

The global wear-leveling operation may be sequentially performed on respective zone groups. For example, the global wear-leveling operation may be sequentially performed on the first zone group Zone_GR1, a second zone group Zone_GR2, and a third zone group Zone_GR3.

First, during a global wear-leveling operation on the first zone group Zone_GR1, data stored in the first zone block ZB_1 and data stored in the second zone block ZB_2 may be swapped with each other, and data stored in the third zone block ZB_3 and data stored in the fourth zone block ZB_4 may be swapped with each other. The time required to perform the global wear-leveling operation on the first zone group Zone_GR1 may be the time required to store data, stored in the first zone block ZB_1 in which the largest amount of data is stored, in the second zone block ZB_2.

Next, during a global wear-leveling operation on the second zone group Zone_GR2, data stored in the fifth zone block ZB_5 and data stored in the sixth zone block ZB_6 may be swapped with each other, and data stored in the seventh zone block ZB_7 and data stored in the eighth zone block ZB_8 may be swapped with each other. The time required to perform the global wear-leveling operation on the second zone group Zone_GR2 may be the time required to store data, stored in the sixth zone block ZB_6 in which the largest amount of data is stored, in the fifth zone block ZB_5.

Next, during a global wear-leveling operation on the third zone group Zone_GR3, data stored in the ninth zone block ZB_9 and data stored in the tenth zone block ZB_10 may be swapped with each other, and data stored in the eleventh zone block ZB_11 and data stored in the twelfth zone block ZB_12 may be swapped with each other. The time required to perform the global wear-leveling operation on the third zone group Zone_GR3 may be the time required to store data, stored in the eleventh zone block ZB_11 in which the largest amount of data is stored, in the twelfth zone block ZB_12.

The time required to perform the global wear-leveling operation on each of the zone groups may vary with the extent to which data is stored in each of the zone blocks. As illustrated in FIG. 5, when a zone block in which a large amount of data is stored is present in each of the zone groups, the time required to perform a wear-leveling operation may be lengthened.

FIG. 6 is a diagram illustrating zone group information and zone block occupancy information according to an embodiment of the present disclosure.

In FIG. 6, a description will be made with reference to FIG. 5. Referring to FIG. 6, the buffer memory 230 illustrated in FIG. 1 may store zone group information Zone Group Info and zone block occupancy information Data occupancy Info.

The zone group information Zone Group Info may be information in which zone blocks, controlled by different control cores, are mapped to a zone group. The buffer memory 230 may store information about the first zone group Zone_GR1 which is one zone group to which the first to fourth zone blocks ZB_1 to ZB_4 are mapped, the second zone group Zone_GR2 which is one zone group to which the fifth to eighth zone blocks ZB_5 to ZB_8 are mapped, and the third zone group Zone_GR3 which is one zone group to which the ninth to twelfth zone blocks ZB_9 to ZB_12 are mapped. The wear-leveling controller 230 illustrated in FIG. 1 may control the plurality of control cores so that pieces of data between zone blocks included in each zone group are swapped based on the zone group information Zone Group Info.

The zone block occupancy information Data occupancy Info may be information about the size of data stored in each of zone blocks or information about an available space in each of the zone blocks. For example, as illustrated in FIG. 5, the case where six pieces of data can be stored in one zone block is described by way of example. That is, because five pieces of data are stored in the first zone block controlled by the first control core, zone block occupancy information for the first zone block may be 5. In the first zone block, only one piece of data may be additionally stored, and thus the available space in the first zone block may be 1. Similarly, zone block occupancy information for the fifth zone block controlled by the first control core may be 1, and zone block occupancy information for the ninth zone block may be 2. As illustrated in FIG. 6, among zone blocks controlled by the first control core, the first zone block ZB_1 in which the largest amount of data is stored may be included in the first zone group Zone_GR1, among zone blocks controlled by the second control core, the sixth zone block ZB_6 in which the largest amount of data is stored may be included in the second zone group Zone_GR2, among zone blocks controlled by the third control core, the eleventh zone block ZB_11 in which the largest amount of data is stored may be included in the third zone group Zone_GR3, and among zone blocks controlled by the fourth control core, the eighth zone block in which the largest amount of data is stored may be included in the second zone group Zone_GR2.

Figure 7:
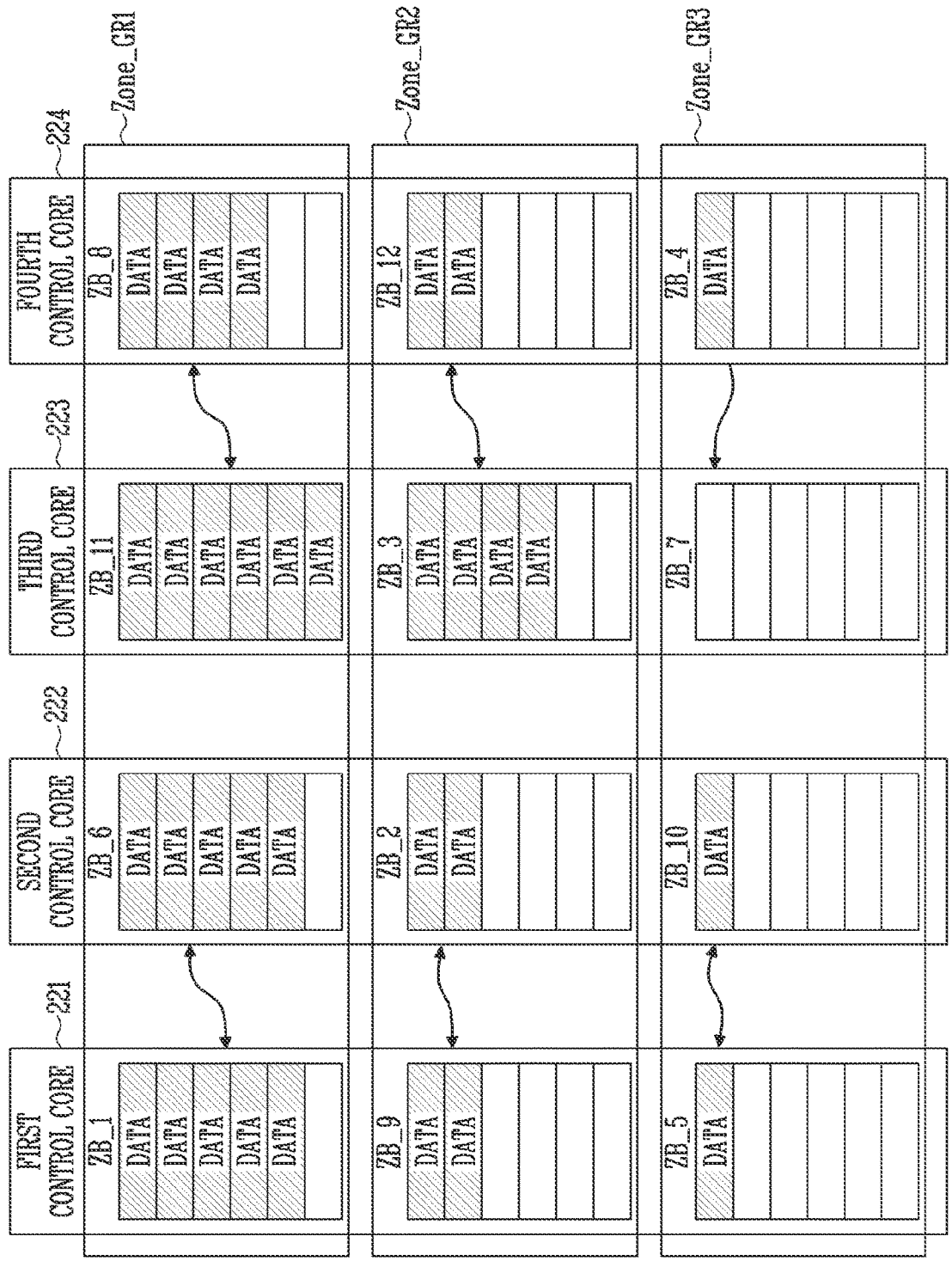
FIG. 7 is a diagram illustrating a global wear-leveling operation on a zone group mapped based on zone block occupancy information according to an embodiment of the present disclosure.

FIG. 7 is a diagram illustrating a global wear-leveling operation on zone groups mapped based on zone block occupancy information according to an embodiment of the present disclosure.

Referring to FIG. 7, the wear-leveling controller 240 illustrated in FIG. 1 may update the zone group information based on the zone block occupancy information. In detail, the wear-leveling controller 240 may map zone blocks having the largest data size (i.e., the largest size of stored data), among zone blocks controlled by respective control cores, to a first zone group Zone_GR1. For example, among zone blocks controlled by the first control core 221, a first zone block ZB_1 having the largest data size, among zone blocks controlled by the second control core, a sixth zone block ZB_6 having the largest data size, among zone blocks controlled by the third control core, an eleventh zone block ZB_11 having the largest data size, and among zone blocks controlled by the fourth control core, an eighth zone block ZB_8 having the largest data size may be mapped to the first zone group Zone_GR1. Similarly, the wear-leveling controller 240 may map a ninth zone block ZB_9, a second zone block ZB_2, a third zone block ZB_3, and a twelfth zone block ZB_12, each having the second-largest data size, among zone blocks controlled by respective control cores, to a second zone group Zone_GR2. Further, the wear-leveling controller 240 may map a fifth zone block ZB_5, a tenth zone block ZB_10, a seventh zone block ZB_7, and a fourth zone block ZB_4, each having the third-largest data size, among zone blocks controlled by respective control cores, to a third zone group Zone_GR3.

The wear-leveling controller 240 may control the plurality of control cores to perform global wear-leveling operations on respective zone groups based on the updated zone group information. In detail, the wear-leveling controller 240 may control the first to fourth control cores 221 to 224 to swap data stored in the first zone block ZB_1 included in the first zone group Zone_GR1 with data stored in the sixth zone block ZB_6 and to swap data stored in the eleventh zone block ZB_11 with data stored in the eighth zone block ZB_8. Similarly, the wear-leveling controller 240 may sequentially perform global wear-leveling operations on the second zone group Zone_GR2 and the third zone group Zone_GR3, respectively.

The time required to perform the global wear-leveling operation on the first zone group Zone_GR1 may be the time required to store the data, stored in the eleventh zone block ZB_11 in which the largest amount of data is stored, in the eighth zone block ZB_8.

Because the time required to perform the global wear-leveling operation on the second zone group Zone_GR2 is the time required to store the data, stored in the third zone block ZB_3 in which the largest amount of data is stored, in the twelfth zone block ZB_12, this time may be shorter than the time required to perform the global wear-leveling operation on the second zone group Zone_GR2 of FIG. 5, that is, the time required to store data, stored in the sixth zone block ZB_6, in the fifth zone block ZB_5.

Because the time required to perform the global wear-leveling operation on the third zone group Zone_GR3 is the time required to swap data stored in the fifth zone block ZB_5 with data stored in the tenth zone block ZB_10, the time may be shorter than the time required to perform a global wear-leveling operation on the third zone group Zone_GR3 of FIG. 5, that is, the time required to store data, stored in the eleventh zone block ZB_11, in the twelfth zone block ZB_12.

In an embodiment, the wear-leveling controller 240 may map zone blocks having the same rank of a data size (i.e., the size of stored data), among zone blocks controlled by respective control cores, to the corresponding zone group, and may perform a global wear-leveling operation of swapping pieces of data between the zone blocks included in the zone group. The wear-leveling controller 240 may reduce the time required to perform the global wear-leveling operation by swapping the pieces of data between zone blocks having the same rank of a data size, among the zone blocks controlled by respective control cores. In detail, when the time required to store one piece of data is 1, the time required for a global wear-leveling operation is described by comparing FIGS. 5 and 7 with each other. First, in FIG. 5, the time required to perform a global wear-leveling operation on the first zone group Zone_GR1 may be 5, which is the time required to store data, stored in the first zone block ZB_1, in the second zone block ZB_2. Further, the time required to perform a global wear-leveling operation on the second zone group Zone_GR2 in FIG. 5 may be 5, which is the time required to store data, stored in the sixth zone block ZB_6, in the fifth zone block ZB_5. Furthermore, the time required to perform a global wear-leveling operation on the third zone group Zone_GR3 in FIG. 5 may be 6, which is the time required to store data, stored in the eleventh zone block ZB_11, in the twelfth zone block ZB_12. That is, the time required to perform global wear-leveling operations on the first to third zone groups Zone_GR1 to Zone_GR3 in FIG. 5 may be 16, which is the sum of 5, 5, and 6.

Moreover, in FIG. 7, the time required to perform a global wear-leveling operation on the first zone group Zone_GR1 may be 6, which is the time required to store data, stored in the eleventh zone block ZB_11, in the eighth zone block ZB_8. Further, the time required to perform a global wear-leveling operation on the second zone group Zone_GR2 in FIG. 7 may be 4, which is the time required to store data, stored in the third zone block ZB_3, in the twelfth zone block ZB_12. Furthermore, the time required to perform a global wear-leveling operation on the third zone group Zone_GR3 in FIG. 7 may be 1, which is the time required to store data, stored in the fifth zone block ZB_5, in the tenth zone block ZB_10. That is, the time required to perform global wear-leveling operations on the first to third zone groups Zone_GR1 to Zone_GR3 in FIG. 7 may be 11, which is the sum of 6, 4, and 1.

The wear-leveling controller 240 may perform global wear-leveling operations on the zone groups mapped based on the sizes of pieces of data stored in the zone blocks, thus reducing the time required to perform the global wear-leveling operations from 16 of FIGS. 5 to 11 of FIG. 7.

FIG. 8 is a diagram illustrating updated zone group information and zone block occupancy information according to an embodiment of the present disclosure.

Referring to FIG. 8, the buffer memory 230 may store updated zone group information Zone Group Info. The zone group information Zone Group Info may be updated based on zone block occupancy information Data occupancy Info. The buffer memory 230 may store information about a first zone group Zone_GR1 which is one zone group to which a first zone block ZB_1, a sixth zone block ZB_6, an eleventh zone block ZB_11, and an eighth zone block ZB_8, each having the largest data size, among zone blocks controlled by respective control cores, are mapped. The buffer memory 230 may store information about a first zone group Zone_GR1 which is one zone group to which the first zone block ZB_1, the sixth zone block ZB_6, the eleventh zone block ZB_11, and the eighth zone block ZB_8, each having the smallest available space size, among the zone blocks controlled by respective control cores, are mapped. The buffer memory 230 may store information about a second zone group Zone_GR2 which is one zone group to which a ninth zone block ZB_9, a second zone block ZB_2, a third zone block ZB_3, and a twelfth zone block ZB_12, each having the second-largest data size, among zone blocks controlled by respective control cores, are mapped. The buffer memory 230 may store information about a third zone group Zone_GR3 which is one zone group to which a fifth zone block ZB_5, a tenth zone block ZB_10, a seventh zone block ZB_7, and a fourth zone block ZB_4, each having the third-largest data size, among zone blocks controlled by respective control cores, are mapped. That is, the buffer memory 230 may store the information about the third zone group Zone_GR3 which is one zone group to which the fifth zone block ZB_5, the tenth zone block ZB_10, the seventh zone block ZB_7, and the fourth zone block ZB_4, each having the largest available space size, among the zone blocks controlled by respective control cores, are mapped.

In an embodiment, the zone group information Zone Group Info may include zone group information generated in descending order from the first zone group Zone_GR1 including zone blocks in which the largest amount of data is stored to the third zone group Zone_GR3 including zone blocks in which the smallest amount of data is stored, among the zone blocks controlled by respective control cores. The zone group information Zone Group Info may include zone group information generated in ascending order from the first zone group Zone_GR1 including zone blocks having the smallest available space size to the third zone group Zone_GR3 including zone blocks having the largest available space size, among the zone blocks controlled by respective control cores. The wear-leveling controller 240 may update zone blocks having the same rank of a data size, among the zone blocks controlled by respective control cores, to a zone group based on the zone block occupancy information Data occupancy Info.

In an embodiment, the zone group information Zone Group Info may be periodically updated based on the zone block occupancy information Data occupancy Info. For example, the zone group information Zone Group Info may be updated based on the zone block occupancy information Data occupancy Info before a global wear-leveling operation is performed.

Figure 9:
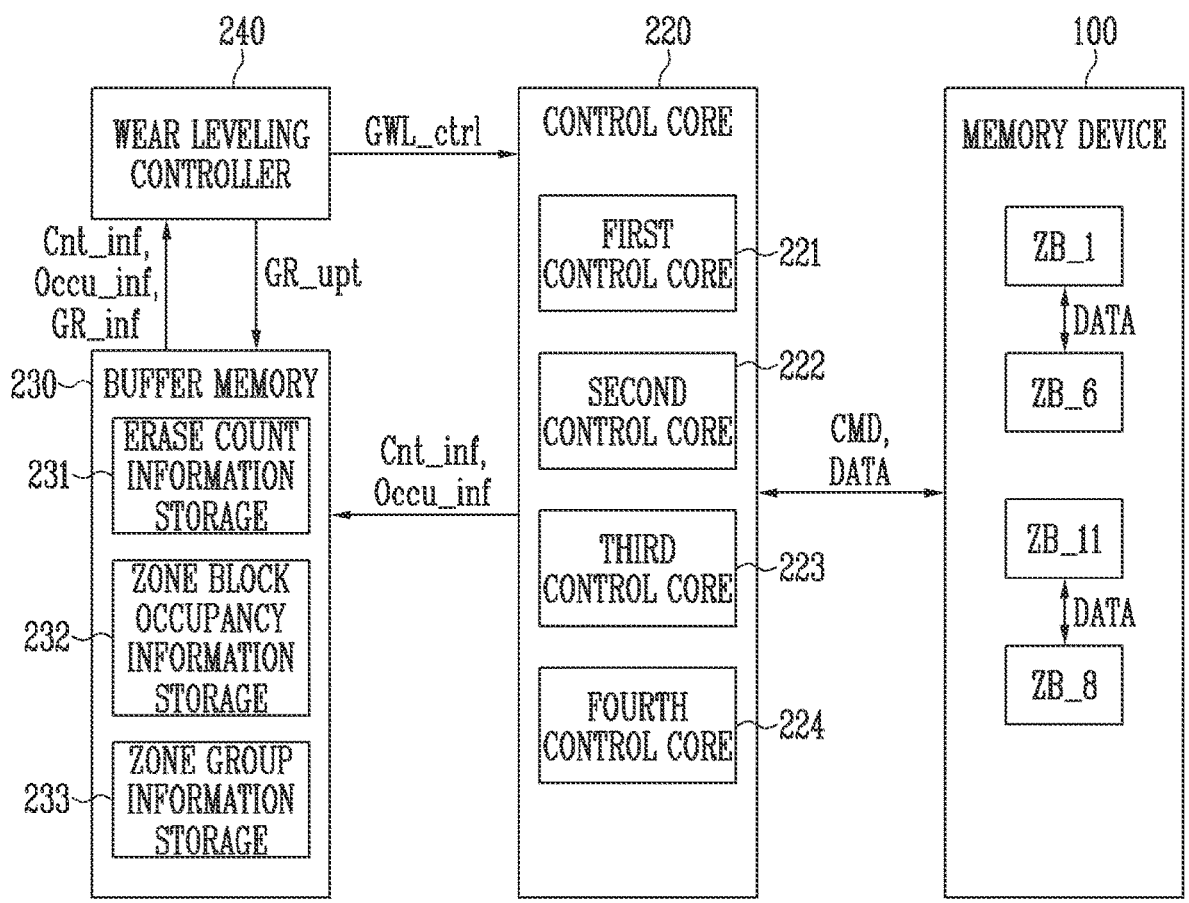
FIG. 9 is a diagram illustrating a global wear-leveling operation of a memory system according to an embodiment of the present disclosure.

FIG. 9 is a diagram illustrating a global wear-leveling operation of a memory system according to an embodiment of the present disclosure.

Referring to FIG. 9, each of the first to fourth control cores 221 to 224 may control a plurality of zone blocks. When an erase operation is performed on a plurality of zone blocks, each of the first to fourth control cores 221 to 224 may provide erase count value information Cnt_inf for the zone blocks to the buffer memory 230. The erase count value information Cnt_inf may be updated when the erase operation is performed on the plurality of zone blocks. The erase count value information Cnt_inf may be stored in an erase count information storage 231.

Each of the first to fourth control cores 221 to 224 may provide zone block occupancy information Occu_inf to the buffer memory 230. The zone block occupancy information Occu_inf may be updated when data is stored in the plurality of zone blocks or when data, stored in the plurality of zone blocks, is erased. The zone block occupancy information Occu_inf may be stored in a zone block occupancy information storage 232.

The wear-leveling controller 240 may determine whether a global wear-leveling operation is to be performed based on the erase count value information Cnt_inf. In an embodiment, the wear-leveling controller 240 may control the first to fourth control cores 221 to 224 so that, when an erase count value for any of the first to fourth control cores 221 to 224 is greater than a reference count value, the global wear-leveling operation is performed.

Here, the wear-leveling controller 240 may map zone blocks controlled by different control cores to a zone group based on the zone group occupancy information Occu_inf. For example, as described above with reference to FIG. 7, among the zone blocks controlled by respective first to fourth control cores 221 to 224, a first zone block ZB_1, a sixth zone block ZB_6, an eleventh zone block ZB_11, and an eighth zone block ZB_8, each having the largest data size, may be mapped to a first zone group. In an embodiment, the wear-leveling controller 240 may update the zone group information GR_inf based on the zone group occupancy information Occu_inf, and thereafter provide updated zone group information GR_upt to the buffer memory 230. The update zone group information GR_upt may be stored in a zone group information storage 233.

Thereinafter, the wear-leveling controller 240 may provide a wear-leveling control signal GWL_ctrl for controlling swapping pieces of data between zone blocks included in the zone group to the first to fourth control cores 221 to 224. The first to fourth control cores 221 to 224 may control the memory device 100 to swap the pieces of data between zone blocks included in the zone group. For example, as described above with reference to FIG. 7, the first to fourth control cores 221 to 224 may control the memory device 100 so that data stored in the first zone block ZB_1 controlled by the first control core 221 is swapped with data stored in the sixth zone block ZB_6 controlled by the second control core 222 and so that data stored in the eleventh zone block ZB_11 controlled by the third control core 223 is swapped with data stored in the eighth zone block ZB_8 controlled by the fourth control core 224. In an embodiment, the global wear-leveling operation may be sequentially performed on respective zone groups. For example, when the global wear-leveling operation on the first zone group is terminated, a global wear-leveling operation may be performed on the second zone group.

Figure 10:
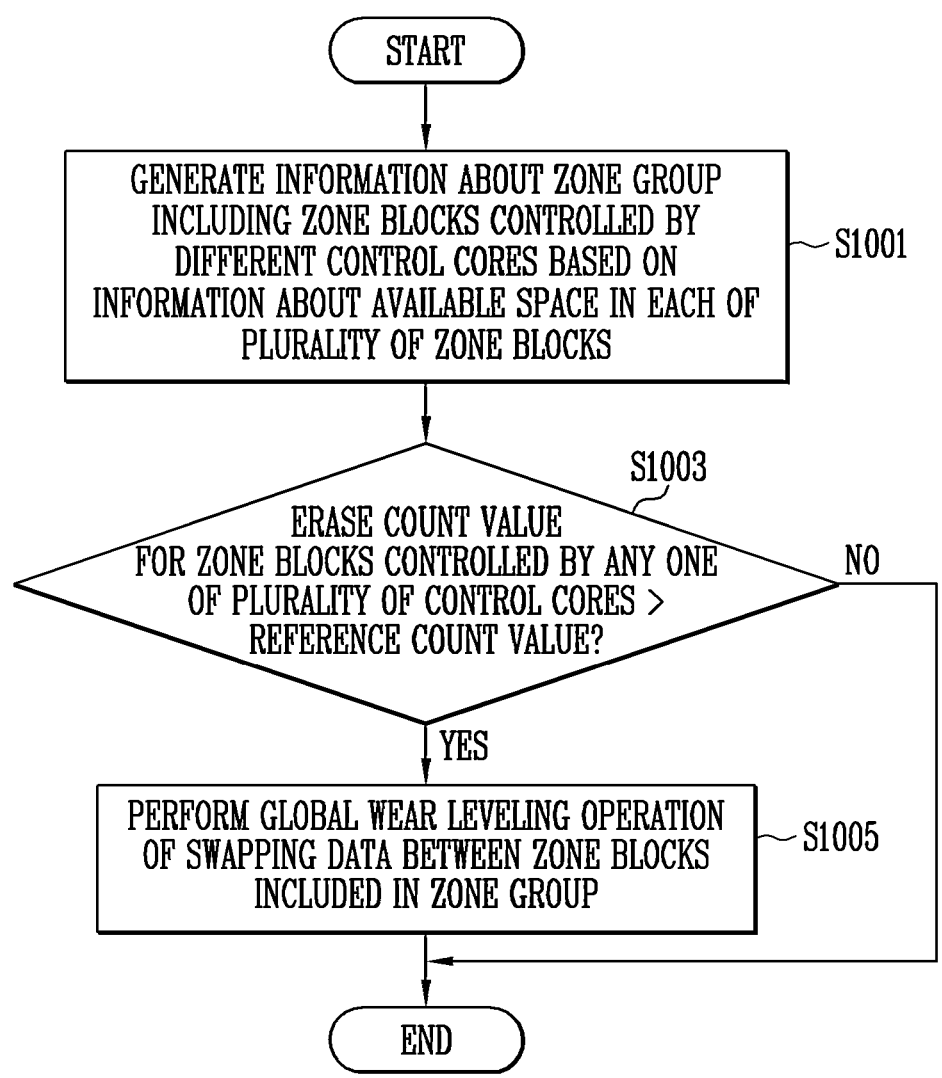
FIG. 10 is a flowchart illustrating a global wear-leveling operation of a memory system according to an embodiment of the present disclosure.

FIG. 10 is a flowchart illustrating a global wear-leveling operation of a memory system according to an embodiment of the present disclosure.

Referring to FIG. 10, at operation S1001, the memory system 50 may generate information about a zone group including zone blocks controlled by different control cores based on information about an available space in each of a plurality of zone blocks. The zone blocks included in the zone group may be zone blocks having the same rank of the available space size, among the zone blocks controlled by the plurality of control cores. The zone group information may be stored in the buffer memory. The zone group information may be updated at each preset period based on zone block occupancy information.

At operation S1003, the memory system 50 may determine whether an erase count value for zone blocks controlled by any of the plurality of control cores is greater than a reference count value by comparing the erase count value by the reference count value. When the erase count value for the zone blocks controlled by any control core is greater than the reference count value, operation S1005 may be performed. On the other hand, when the erase count value for the zone blocks controlled by any control core is less than the reference count value, a global wear-leveling operation may not be performed.

At operation S1005, the memory system 50 may perform a global wear-leveling operation of swapping pieces of data between zone blocks included in the corresponding zone group.

Figure 11:
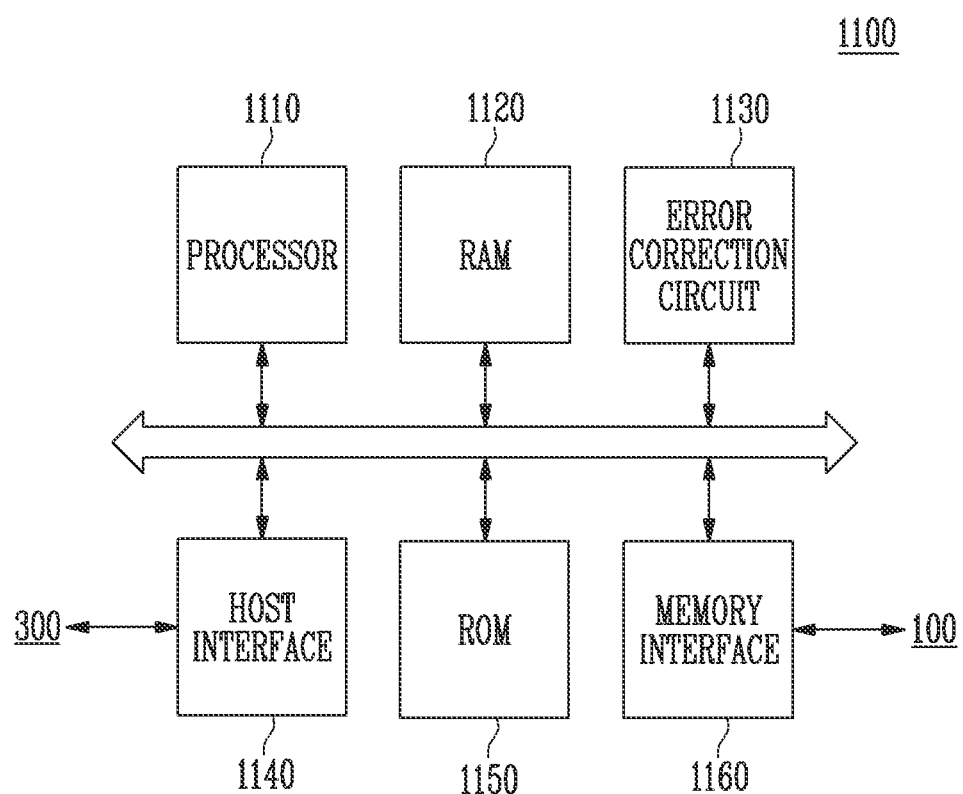
FIG. 11 is a diagram illustrating a memory controller according to an embodiment of the present disclosure.

FIG. 11 is a diagram illustrating a memory controller 1100 according to an embodiment of the present disclosure.

The memory controller 1100 may correspond to the memory controller 200 of FIG. 1.

Referring to FIG. 11, the memory controller 1100 may include a processor 1110, a random access memory (RAM) 1120, an error correction circuit 1130, a host interface 1140, a read only memory (ROM) 1150, and a memory interface 1160.

The processor 1110 may control the overall operation of the memory controller 1100. The processor 1110 may control the operation of the memory controller 1100 to store data requested by a host 300 in the memory device 100. In an embodiment, the processor 1110 may include the control core 220 and the wear-leveling controller 240 illustrated in FIG. 1. In an embodiment, the processor 1110 may control the memory device 100 to perform a global wear-leveling operation based on the wear-levels of a plurality of zone blocks.

The RAM 1120 may be used as a buffer memory, a cache memory or a working memory of the memory controller 1100. In an embodiment, the RAM 1120 may allocate a plurality of zones, respectively corresponding to logical address groups provided by the host, to the logical address groups. In an embodiment, the RAM 1120 may include the buffer memory 230 illustrated in FIG. 1. In an embodiment, the RAM 1120 may store information about erase count values for the plurality of zone blocks, information about zone groups, and zone block occupancy information.

The error correction circuit 1130 may perform error correction. The error correction circuit 1130 may perform error correction code (ECC) encoding based on data to be written to the memory device 100 through the memory interface 1160. The ECC-encoded data may be transferred to the memory device 100 through the memory interface 1160. The error correction circuit 1130 may perform error correction decoding (ECC decoding) on data received from the memory device 100 through the memory interface 1160. In an embodiment, the error correction circuit 1130 may be included, as a component of the memory interface 1160, in the memory interface 1160.

The ROM 1150 may store various types of information required for the operation of the memory controller 1100 in the form of firmware.

The memory controller 1100 may communicate with an external device (e.g., the host 300, an application processor, or the like) through the host interface 1140. The memory controller 1100 may be provided with data through the host interface 1140. In an embodiment, the host interface 1140 may include the host core 210 illustrated in FIG. 1. In an embodiment, the host interface 1140 may allocate logical address groups respectively corresponding to the plurality of zones provided by the host 300 to the processor 1110.

The memory controller 1100 may communicate with the memory device 100 through the memory interface 1160. The memory controller 1100 may transmit a command, an address, a control signal, etc. to the memory device 100 and receive data from the memory device 100 through the memory interface 1160. For example, the memory interface 1160 may include a NAND interface.

Figure 12:
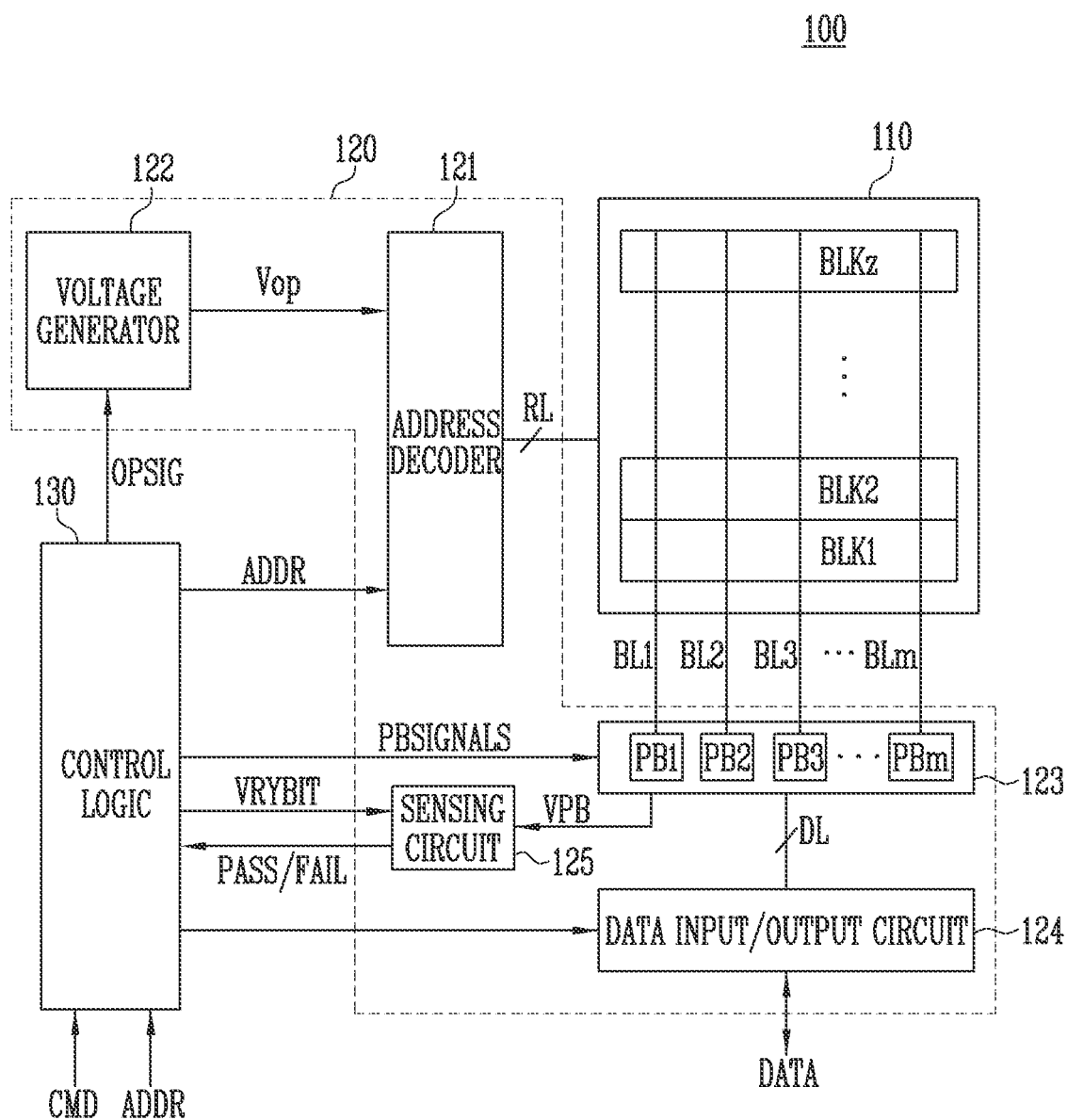
FIG. 12 is a diagram illustrating the memory device of FIG. 1 according to an embodiment of the present disclosure.

FIG. 12 is a diagram illustrating the memory device 100 of FIG. 1 according to an embodiment of the present disclosure.

Referring to FIG. 12, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be implemented as a plurality of zone blocks. In an embodiment, the unit of a zone block may be that of a memory block. In an embodiment, the unit of a zone block may be that of a super block. The plurality of memory blocks BLK1 to BLKz may be coupled to an address decoder 121 through row lines RL. The plurality of memory blocks BLK1 to BLKz may be coupled to a page buffer group 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line, among the plurality of memory cells, may be defined as one page. That is, the memory cell array 110 may be composed of a plurality of pages. In an embodiment, a page may be the unit by which data is stored or stored data is read. A memory block may be the unit by which data is erased. In an embodiment of the present disclosure, each of the memory blocks BLK1 to BLKz included in the memory cell array 110 may include a plurality of dummy memory cells. For the dummy memory cells, one or more dummy memory cells may be coupled in series between a drain select transistor and memory cells and between a source select transistor and the memory cells.

Each of the memory cells of the memory device 100 may be implemented as a single-level cell (SLC) capable of storing one bit of data, a multi-level cell (MLC) capable of storing two bits of data, a triple-level cell (TLC) capable of storing three bits of data, or a quad-level cell (QLC) capable of storing four bits of data.

The peripheral circuit 120 may drive the memory cell array 110. In an example, the peripheral circuit 120 may drive the memory cell array 110 so that a program operation, a read operation, and an erase operation are performed under the control of the control logic 130. In an example, the peripheral circuit 120 may apply various operating voltages to the row lines RL and the bit lines BL1 to BLm or discharge the applied voltages under the control of the control logic 130.

The peripheral circuit 120 may include the address decoder 121, a voltage generator 122, the page buffer group 123, a data input/output circuit 124, and a sensing circuit 125.

The address decoder 121 may be coupled to the memory cell array 110 through the row lines RL. The row lines RL may include drain select lines, word lines, source select lines, and a source line. In an embodiment, the word lines may include normal word lines and dummy word lines. In an embodiment, the row lines RL may further include a pipe select line.

The address decoder 121 may be operated under the control of the control logic 150. The address decoder 121 may receive addresses ADDR from the control logic 130.

The address decoder 121 may decode a block address, among the received addresses ADDR. The address decoder 121 may select at least one of the memory blocks BLK1 to BLKz according to the decoded block address. The address decoder 121 may decode a row address, among the received addresses ADDR. The address decoder 121 may select at least one word line WL of the selected memory block by applying voltages supplied from the voltage generator 122 to the at least one word line WL according to the decoded row address.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to unselected word lines.

During a read operation, the address decoder 121 may apply a read voltage to the selected word line and apply a read pass voltage having a level higher than that of the read voltage to unselected word lines.

The erase operation of the memory device 100 may be performed on a memory block basis. During the erase operation, addresses ADDR input to the memory device 100 may include a block address. The address decoder 121 may decode the block address and select one memory block according to the decoded block address. During the erase operation, the address decoder 121 may apply a ground voltage to word lines coupled to the selected memory block.

The address decoder 121 may decode a column address among the received addresses ADDR. The decoded column address may be transferred to the page buffer group 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 may be used as an operating voltage for the memory device 100.

In an embodiment, the voltage generator 122 may generate various operating voltages Vop that are used for program, read, and erase operations in response to an operation signal OPSIG. The voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate a plurality of operating voltages Vop having various voltage levels, and may generate the plurality of operating voltages Vop by selectively enabling the plurality of pumping capacitors under the control of the control logic 130.

The generated operating voltages Vop may be supplied to the memory cell array 110 by the address decoder 121.

The page buffer group 123 may include first to m-th page buffers PB1 to PBm. The first to m-th page buffers PB1 to PBm may be coupled to the memory cell array 110 through the first to m-th bit lines BL1 to BLm, respectively. The first to m-th page buffers PB1 to PBm may be operated under the control of the control logic 130.

The first to m-th page buffers PB1 to PBm may transmit/receive data DATA to/from the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. The memory cells in the selected page may be programmed based on the received data DATA. Memory cells coupled to a bit line to which a program enable voltage (e.g., a ground voltage) is applied may have increased threshold voltages. The threshold voltages of memory cells coupled to a bit line to which a program-inhibit voltage (e.g., a supply voltage) is applied may be maintained. During a verify operation, the first to m-th page buffers PB1 to PBm may read the data DATA stored in the selected memory cells from the selected memory cells through the bit lines BL1 to BLm.

During a read operation, the page buffer group 123 may read data DATA from the memory cells in the selected page through the bit lines BL1 to BLm, and may store the read data DATA in the first to m-th page buffers PB1 to PBm.

During an erase operation, the page buffer group 123 may allow the bit lines BL1 to BLm to float. In an embodiment, the page buffer group 123 may include a column select circuit.

In an embodiment, while pieces of data stored in some of the plurality of page buffers included in the page buffer group 123 are being programmed to the memory cell array 110, the remaining page buffers may receive new data from the memory controller 200 and then store the new data.

The data input/output circuit 124 may be coupled to the first to m-th page buffers PB1 to PBm through the data lines DL. The data input/output circuit 124 may be operated under the control of the control logic 130.

The data input/output circuit 124 may include a plurality of input/output buffers (not illustrated) which receive input data DATA. During a program operation, the data input/output circuit 124 may receive the data DATA to be stored from an external controller (not illustrated). During a read operation, the data input/output circuit 124 may output the data DATA, received from the first to m-th page buffers PB1 to PBm included in the page buffer group 123, to the external controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the page buffer group 123 with a reference voltage generated by the reference current. In an example, the sensing circuit 125 may output a pass signal to the control logic 130 when the magnitude of the sensing voltage VPB is higher than that of the reference voltage. In an example, the sensing circuit 125 may output a fail signal to the control logic 130 when the magnitude of the sensing voltage VPB is lower than that of the reference voltage.

The control logic 130 may be coupled to the address decoder 121, the voltage generator 122, the page buffer group 123, the data input/output circuit 124, and the sensing circuit 125. The control logic 130 may control the overall operation of the memory device 100. The control logic 130 may be operated in response to a command CMD transferred from an external device.

The control circuit 130 may control the peripheral circuit 120 by generating various types of signals in response to the command CMD and addresses ADDR. For example, the control logic 130 may generate the operation signal OPSIG, the addresses ADDR, page buffer control signals PBSIGNALS, and the enable bit signal VRYBIT in response to the command CMD and the addresses ADDR. The control logic 130 may output the operation signal OPSIG to the voltage generator 122, may output the addresses ADDR to the address decoder 121, may output the page buffer control signals PBSIGNALS to the page buffer group 123, and may output the enable bit signal VRYBIT to the sensing circuit 125. In addition, the control logic 130 may determine whether a verify operation has passed or failed in response to the pass or fail signal PASS or FAIL output from the sensing circuit 125.

In accordance with the present disclosure, there are provided a memory controller a memory controller that is capable of equalizing wear-levels between nonvolatile memory areas and a memory system including the memory controller.

While the present teachings have been illustrated and described with respect to specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory controller comprising:
   a plurality of control cores configured to control a plurality of zone blocks respectively corresponding to logical address groups provided by a host;
   a buffer memory configured to store zone block occupancy information about a size of data stored in each of the plurality of zone blocks; and
   a wear-leveling controller configured to:
   group zone blocks, which are controlled by different control cores, having the same rank of the size of the stored data among zone blocks controlled by each of the plurality of control cores, to a zone group, based on the zone block occupancy information; and
   control the plurality of control cores to perform a global wear-leveling operation of swapping pieces of data between the grouped zone blocks having the same rank of the size of the stored data included in the zone group based on a wear-level of the plurality of zone blocks.

2. The memory controller according to claim 1, wherein the buffer memory is further configured to store information about an erase count value for the zone blocks controlled by each of the plurality of control cores.

3. The memory controller according to claim 2, wherein the wear-level of the plurality of zone blocks is the erase count value for zone blocks controlled by one of the plurality of control cores.

4. The memory controller according to claim 3, wherein the wear-leveling controller controls the plurality of control cores to perform the global wear-leveling operation when the erase count value for the zone blocks controlled by the one control core is greater than a reference count value.

5. The memory controller according to claim 4, wherein the global wear-leveling operation is an operation of swapping, among the grouped zone blocks having the same rank of the size of the stored data included in the zone group, data between a zone block controlled by the one control core and a zone block controlled by another control core having a lowest erase count value among the plurality of control cores.

6. The memory controller according to claim 1, wherein the zone block occupancy information about the size of the data stored in each of the plurality of zone blocks is updated before the global wear-leveling operation is performed.

7. The memory controller according to claim 1,
   wherein the buffer memory is further configured to store information about a plurality of zone groups each including zone blocks, which are controlled by different control cores, having the same rank of the size of the stored data among the zone blocks controlled by each of the plurality of control cores, and
   wherein the wear-leveling controller is further configured to control the plurality of control cores to sequentially perform the global wear-leveling operation on the plurality of zone groups.

8. The memory controller according to claim 1,
   wherein the buffer memory is further configured to store information about a plurality of zone groups each including zone blocks, which are controlled by different control cores, having the same rank of the size of the stored data among the zone blocks controlled by each of the plurality of control cores, and
   wherein the wear-leveling controller controls the plurality of control cores to sequentially perform the global wear-leveling operation on the plurality of zone groups in an ascending order from a lowest rank to a highest rank of the size of the stored data.

9. A method of operating a memory controller, the memory controller including a plurality of control cores configured to control a plurality of zone blocks respectively corresponding to logical address groups provided by a host, the method comprising:
   generating zone block occupancy information about a size of data stored in each of the plurality of zone blocks;
   grouping zone blocks, which are controlled by different control cores, having the same rank of the size of the stored data among zone blocks controlled by each of the plurality of control cores, to a zone group, based on the zone block occupancy information; and
   performing a global wear-leveling operation of swapping pieces of data between the grouped zone blocks having the same rank of the size of the stored data included in the zone group based on a wear-level of the plurality of zone blocks.

10. The method according to claim 9, wherein the wear-level of the plurality of zone blocks is an erase count value for the zone blocks controlled by one of the plurality of control cores.

11. The method according to claim 10, wherein the global wear-leveling operation is performed when the erase count value for the zone blocks controlled by the one control core is greater than a reference count value.

12. The method according to claim 11, wherein the global wear-leveling operation includes swapping, among the grouped zone blocks having the same rank of the size of the stored data included in the zone group, data between a zone block controlled by the one control core and a zone block controlled by another control core having a lowest erase count value among the plurality of control cores.

13. A memory system comprising:
a plurality of zone blocks each including nonvolatile memory areas and respectively corresponding to logical address groups provided by a host; and
a controller configured to:
map, based on a size of data stored in each of the plurality of zone blocks, zone blocks, which are controlled by different control cores among a plurality of control cores, having the same rank of the size of the stored data among zone blocks controlled by each of the plurality of control cores, to a zone group, and
perform a global wear-leveling operation of swapping pieces of data between the mapped zone blocks having the same rank of the size of the stored data included in the zone group.

14. The memory system according to claim 13, wherein the controller comprises a buffer memory configured to store information about the zone group and information about an erase count value for the zone blocks controlled by each of the plurality of control cores.

15. The memory system according to claim 14, wherein the controller performs the global wear-leveling operation when the erase count value for the zone blocks controlled by one of the plurality of control cores is greater than a reference count value.

16. The memory system according to claim 15, wherein the global wear-leveling operation is an operation of swapping, among the mapped zone blocks having the same rank of the size of the stored data included in the zone group, data between a zone block controlled by the one control core and a zone block controlled by another control core having a lowest erase count value among the plurality of control cores.

17. The memory system according to claim 14, wherein the controller is further configured to update the information about the zone group at each preset period based on the size of the data stored in each of the plurality of zone blocks.

* * * * *